(12) United States Patent
    Zhao

(10) Patent No.: US 10,530,931 B2
(45) Date of Patent: Jan. 7, 2020

(54) MESSAGE PROCESSING METHOD AND TERMINAL, AND STORAGE MEDIUM

(71) Applicant: TENCENT TECHNOLOGY (SHENZHEN) COMPANY LIMITED, Shenzhen (CN)

(72) Inventor: Tian Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 99 days.

(21) Appl. No.: 15/859,051

(22) Filed: Dec. 29, 2017

(65) Prior Publication Data

US 2018/0124247 A1     May 3, 2018

Related U.S. Application Data

(63) Continuation of application No. PCT/CN2016/081772, filed on May 11, 2016.

(30) Foreign Application Priority Data

Sep. 7, 2015 (CN) .......................... 2015 1 0562638

(51) Int. Cl.
    *H04M 3/533* (2006.01)
    *G10L 17/00* (2013.01)

(52) U.S. Cl.
    CPC ......... *H04M 3/5335* (2013.01); *G10L 17/005* (2013.01); *H04M 3/53366* (2013.01); *H04M 3/53325* (2013.01)

(58) Field of Classification Search
    CPC .. G10L 15/26; G10L 17/005; H04M 2250/74; H04M 3/5335; H04M 3/53366; H04M 3/53325; H04W 4/12
    See application file for complete search history.

(56) References Cited

U.S. PATENT DOCUMENTS

| | | | | |
|---|---|---|---|---|
| 2007/0081636 A1* | 4/2007 | Shaffer | ................ | G06Q 10/107 379/80 |
| 2007/0127688 A1* | 6/2007 | Doulton | ................ | G10L 15/265 379/265.01 |
| 2009/0259472 A1* | 10/2009 | Schroeter | ............. | G10L 13/043 704/260 |
| 2010/0273457 A1* | 10/2010 | Freeman | ................ | H04L 51/24 455/412.2 |
| 2011/0021178 A1* | 1/2011 | Balasaygun | ............ | G10L 17/26 455/413 |

(Continued)

FOREIGN PATENT DOCUMENTS

| | | |
|---|---|---|
| CN | 101072207 A | 11/2007 |
| CN | 103544954 A | 1/2014 |

OTHER PUBLICATIONS

The World Intellectual Property Organization (WIPO) International Search Report for PCT/CN2016/081772 dated Jul. 26, 2016 6 pages (including translation).

*Primary Examiner* — Lisa Hashem
(74) *Attorney, Agent, or Firm* — Anova Law Group, PLLC

(57) ABSTRACT

A message processing method includes acquiring a voice message, selecting identification information corresponding to the voice message according to a marking policy corresponding to the voice message, and displaying the voice message carrying the identification information.

12 Claims, 10 Drawing Sheets

(56) References Cited

U.S. PATENT DOCUMENTS

| | | | |
|---|---|---|---|
| 2012/0077465 A1* | 3/2012 | O'Neill | H04L 51/26 455/412.1 |
| 2013/0165086 A1* | 6/2013 | Doulton | G06Q 10/107 455/414.4 |
| 2014/0067963 A1 | 3/2014 | Chavez | |
| 2019/0020762 A1* | 1/2019 | Rose | H04M 3/5335 |

* cited by examiner

MESSAGE PROCESSING METHOD AND TERMINAL, AND STORAGE MEDIUM

CROSS-REFERENCE TO RELATED APPLICATIONS

This application is a continuation application of PCT International Application No. PCT/CN2016/081772 filed May 11, 2016, which claims priority to Chinese Application No. 201510562638.9 filed Sep. 7, 2015, the entire contents of both of which are incorporated herein by reference.

FIELD OF THE TECHNOLOGY

The present disclosure relates to information processing technologies, and in particular, to a message processing method and terminal, and a computer storage medium.

BACKGROUND OF THE DISCLOSURE

At present, in our daily life, users usually perform chat conversations by using voice messages in instant messaging, and the chat conversation manner gradually becomes a habit. However, it is time-consuming to find a particular voice message in multiple voice messages because the display manners of voice messages in the existing instant messaging are almost the same, and the difference between the voice messages can only be uniquely identified with time. In addition, when there are relatively many voice messages, it is also time-consuming to find a particular voice message by using the time of the voice messages.

SUMMARY

In accordance with the disclosure, there is provided a message processing method including acquiring a voice message, selecting identification information corresponding to the voice message according to a marking policy corresponding to the voice message, and displaying the voice message carrying the identification information.

Also in accordance with the disclosure, there is provided a terminal including a processor and a storage medium storing instructions that, when executed by the processor, cause the processor to acquire a voice message, select identification information corresponding to the voice message according to a marking policy corresponding to the voice message, and display the voice message carrying the identification information.

Also in accordance with the disclosure, there is provided a message processing method including receiving a voice message, receiving first identification information corresponding to the voice message and selected according to a first marking policy, and displaying the voice message in a manner determined according to whether the voice message satisfies a preset rule. The preset rule represents displaying the first voice message along with second identification information selected according to a second marking policy.

Also in accordance with the disclosure, there is provided a terminal including a processor and a storage medium storing instructions that, when executed by the processor, cause the processor to receive a voice message, receive first identification information corresponding to the voice message and selected according to a first marking policy, and display the voice message in a manner determined according to whether the voice message satisfies a preset rule. The preset rule represents displaying the first voice message along with second identification information selected according to a second marking policy.

DESCRIPTION OF EMBODIMENTS

For a better understanding of features and technical contents of the present disclosure, embodiments of the present disclosure are described in detail below with reference to the accompanying drawings. The accompanying drawings are used for reference only rather than limiting the present disclosure.

Figure 1:
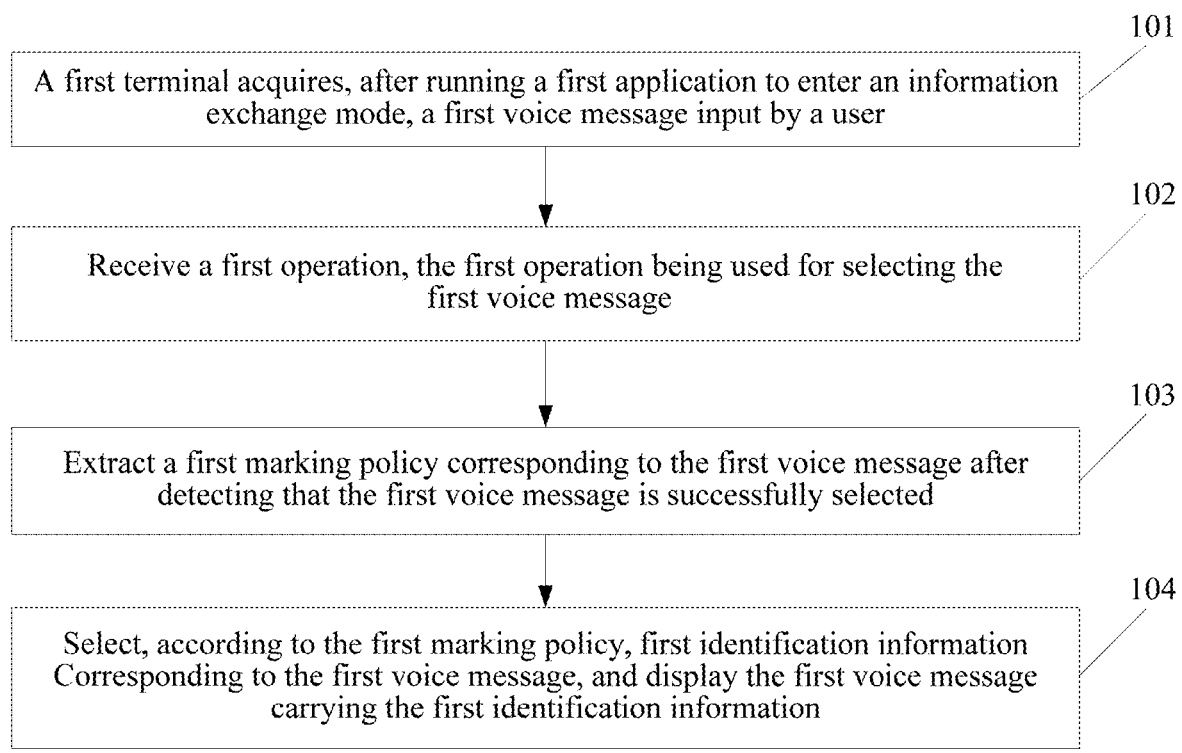
FIG. 1 is a schematic flowchart of a message processing method according to an embodiment of the present disclosure.

FIG. 1 is a schematic flowchart of a message processing method according to an embodiment of the present disclosure. The method is applied to a first terminal. As shown in FIG. 1, at 101, the first terminal acquires, after running a first application to enter an information exchange mode, a first voice message input by a user.

In this embodiment, the first application may be an instant messaging application. In some embodiments, the first terminal may acquire, by using an audio acquisition circuit of the first terminal, the first voice message input by the user.

At 102, a first operation is received. The first operation is used for selecting the first voice message.

At 103, a first marking policy corresponding to the first voice message is extracted after detecting that the first voice message is successfully selected.

In this embodiment, the first marking policy may be a preset marking policy. That is, after receiving the first voice message, the first terminal extracts the first marking policy corresponding to the first voice message from a preset marking policy set, so that the first terminal can perform marking processing on the first voice message according to the first marking policy.

In some embodiments, the first marking policy is a marking policy that is temporarily generated by the first terminal according to the selected first voice message. Specifically, after detecting that the first voice message is successfully selected, the first terminal extracts a preset graphical interaction interface, and displays the preset graphical interaction interface in the first terminal, so that the user can input, by using the preset graphical interaction interface, first identification information used for marking the first voice message. After the first identification information is input, the first terminal generates the first marking policy.

At 104, according to the first marking policy, first identification information corresponding to the first voice message is selected, and the first voice message carrying the first identification information is displayed.

Figure 2:
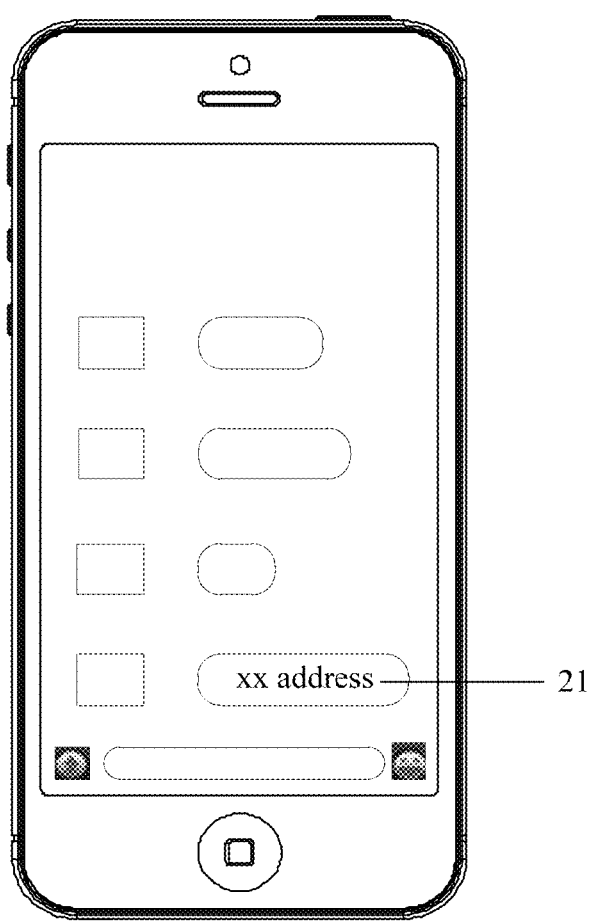
FIG. 2 is a schematic diagram showing a marking manner according to an embodiment of the present disclosure.

In this embodiment, the first identification information may be content information that is selected by the first terminal and that corresponds to the first voice message, and/or may be level information of the first voice message that is selected by the first terminal. As such, by using the first identification information, displaying of the first voice message in the first terminal is different from that of other voice messages. The first identification information may be a text identifier, a picture identifier, or the like that can be the content information corresponding to the first voice message. Using the text identifier as an example, as shown in FIG. 2, text identifying the content of a first voice message 21 may be added to the first voice message 21, to mark the first voice message. For example, the first terminal sends the first voice message 21 to a second terminal, and the general content of the first voice message 21 is an email address. In this case, a text identifier "xx address" may be added to the first voice message 21. A user of the first terminal can quickly recognize the content of the first voice message through the text identifier. In addition, by using the text identifier, displaying of the first voice message is different from that of other voice messages.

As another example, the first identification information may be a feature attribute identifier that can represent the level information, for example, the importance, of the first voice message. Specifically, the feature attribute identifier may be a color feature identifier. That is, the color feature identifier that can represent the level information, for example, the importance, is used for performing color marking on a box body of a dialog box, or an entire area or a part of the area of the dialog box of the voice message. As shown in the following table, different color features represent different importance levels. In this way, it is convenient for a user of the first terminal to determine the importance of the voice message according to the color feature identifier of the voice message.

| Color | Importance |
| --- | --- |
| Red | Most important |
| Orange | Very important |
| yellow | Quite important |
| Blue | Relatively important |
| Green | Not important |

Figure 3:
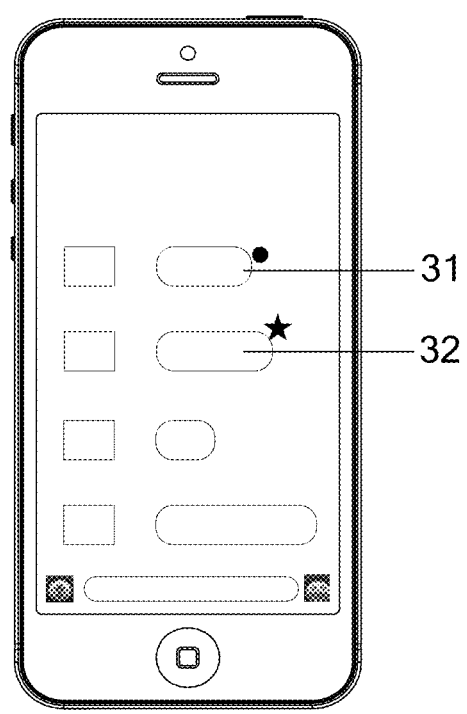
FIG. 3 is a schematic diagram showing a marking manner according to another embodiment of the present disclosure.

In some embodiments, the feature attribute identifier may be a geometric mark or a geometric figure having a color, for example, a dot, a pentagram, a red dot, or a yellow star, that is set near the dialog box of the voice message. For example, as shown in FIG. 3, a dot is set near a dialog box of a first voice message 31, and a pentagram is set near a dialog box of a second voice message 32. In this way, the importance of the voice messages is identified by using different geometric figures, so that the importance of the voice message can be quickly identified.

It should be noted that the first identification information may be only a text identifier, a picture identifier, or the like, or may be only a geometric mark or the like that can represent the importance, or may include both a text identifier, a picture identifier, and/or the like that can represent the content of the voice message and a geometric mark that can represent the importance. In some embodiments, the specific content of the first identification information may be set according to the actual need of a user, or may be preset by the manufacturer of the first terminal.

It should be noted that when the first identification information is text information, the text information may be text information input by the user, or may be text information that is obtained by the first terminal through parsing the first voice message.

In this embodiment, when the first voice message is displayed, the first identification information corresponding to the first voice message is displayed. Therefore, when a user of the first terminal wishes to search a voice message set corresponding to the first application for the first voice message, the first terminal can search for the first voice message by using the first identification information. In this way, the search time of searching for a particular voice message in an instant messaging application by a user is reduced, and hence the user experience is improved.

In this embodiment, the first terminal is a transmitting end, and the second terminal is a receiving end.

According to the message processing method consistent with embodiments of the present disclosure, a first terminal acquires, after running a first application to enter an information exchange mode, a first voice message input by a user; receives a first operation; extracts a first marking policy corresponding to the first voice message after detecting that the first voice message is successfully selected by using the first operation; and further selects, according to the first marking policy, first identification information corresponding to the first voice message, to display the first voice message carrying the first identification information. In this way, the displaying of the first voice message can be distinguished from that of other voice messages, to facilitate a user to search a voice message set of the first application for the first voice message. Therefore, compared with the existing methods of searching for a voice message, the message processing method consistent with the present disclosure can shorten the search time, thereby improving the user experience.

Figure 4:
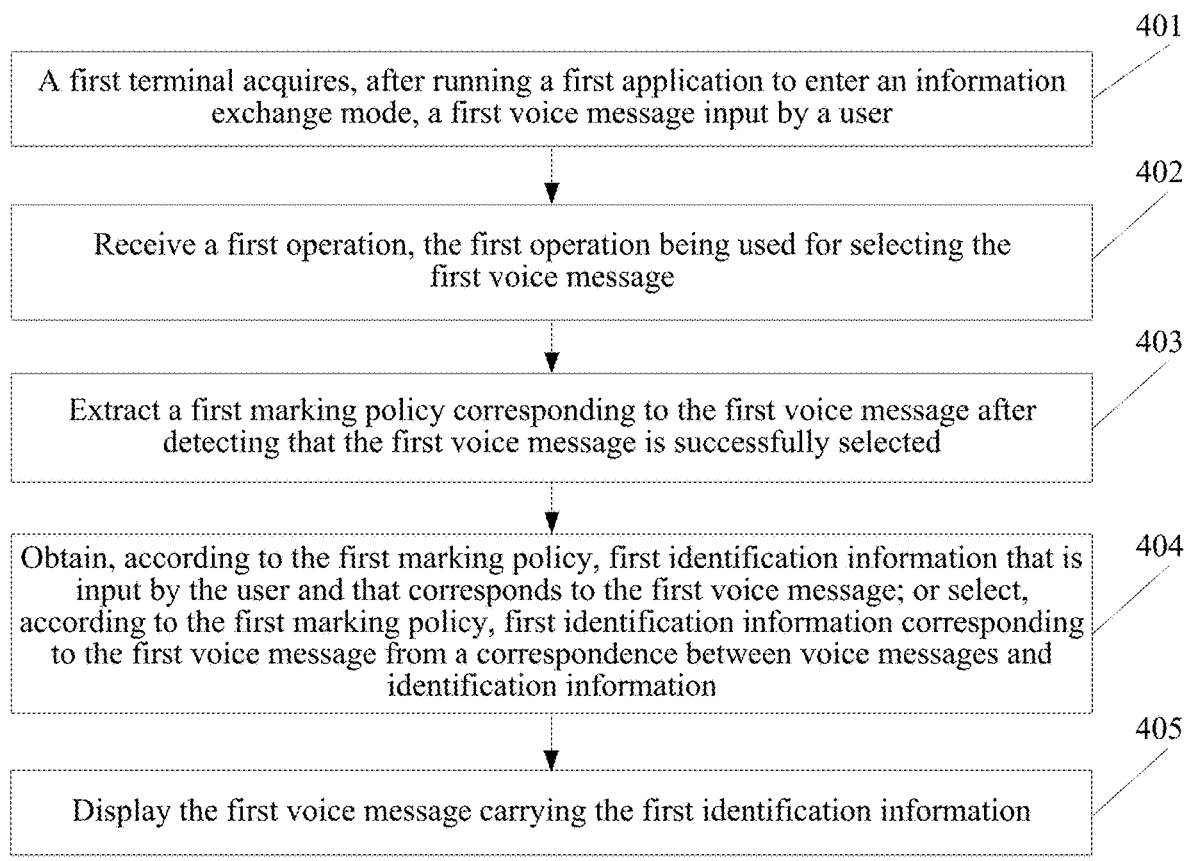
FIG. 4 is a schematic flowchart of a message processing method according to another embodiment of the present disclosure.

FIG. 4 is a schematic flowchart of a message processing method according to an embodiment of the present disclosure. The method is applied to a first terminal. As shown in FIG. 4, at 401, the first terminal acquires, after running a first application to enter an information exchange mode, a first voice message input by a user.

In this embodiment, the first application may be an instant messaging application. In some embodiments, the first terminal may acquire, by using an audio acquisition circuit of the first terminal, the first voice message input by the user.

At 402, a first operation is received. The first operation is used for selecting the first voice message.

At 403, a first marking policy corresponding to the first voice message is extracted after detecting that the first voice message is successfully selected.

In this embodiment, the first marking policy may be a preset marking policy. That is, after receiving the first voice message, the first terminal extracts the first marking policy corresponding to the first voice message from a preset marking policy set, so that the first terminal can select, according to the first marking policy, first identification information corresponding to the first voice message.

In some embodiments, the first marking policy is a marking policy that is temporarily generated by the first terminal according to the selected first voice message. Specifically, after detecting that the first voice message is successfully selected, the first terminal extracts a preset graphical interaction interface, and displays the preset graphical interaction interface in the first terminal, so that the user can input, by using the preset graphical interaction interface, first identification information used for marking the first voice message. After the first identification information is input, the first terminal generates the first marking policy.

Further, because the first marking policy may be a preset marking policy, or may be a marking policy that is temporarily generated according to the first identification information input by the user, the first identification information may be preset identification information, or may be identification information input by the user, as described in more detail below.

When the first marking policy is the preset marking policy, a list that can represent a correspondence between voice messages and identification information is stored in a storage medium of the first terminal or is obtained from another data resource. Therefore, after obtaining the first marking policy, the first terminal can select the first identification information corresponding to the first marking policy from the correspondence list. In some embodiments, a correspondence list among a voice message, a marking policy, and identification information may be set as the preset correspondence list. In this way, the first terminal can perform marking processing on the voice message according to the preset correspondence list without the need for the user to input the identification information to mark the voice message.

When the first marking policy is the marking policy that is temporarily generated according to the first identification information input by the user, the first terminal can directly obtain, from the first marking policy, the first identification information that is input by the user and that corresponds to the first voice message, so as to facilitate obtaining the general content of the first voice message by using the first identification information.

At 404, first identification information input by the user and corresponding to the first voice message is obtained according to the first marking policy, or the first identification information corresponding to the first voice message is selected according to the first marking policy from a correspondence between voice messages and identification information.

At 405, the first voice message carrying the first identification information is displayed.

In this embodiment, the first identification information may be content information that is selected by the first terminal and that corresponds to the first voice message, and/or may be level information of the first voice message that is selected by the first terminal. As such, by using the first identification information, displaying of the first voice message in the first terminal is different from that of other voice messages. The first identification information may be a text identifier, a picture identifier, or the like that can be the content information corresponding to the first voice message. Using the text identifier as an example, as shown in FIG. 2, text identifying the content of a first voice message 21 may be added to the first voice message 21, to mark the first voice message. For example, the first terminal sends the first voice message 21 to a second terminal, and the general content of the first voice message 21 is an email address. In this case, a text identifier "xx address" may be added to the first voice message 21. A user of the first terminal can quickly recognize the content of the first voice message through the text identifier. In addition, by using the text identifier, displaying of the first voice message is different from that of other voice messages.

As another example, the first identification information may be a feature attribute identifier that can represent the level information, for example, the importance, of the first voice message. Specifically, the feature attribute identifier may be a color feature identifier. That is, the color feature identifier that can represent the level information, for example, the importance, is used for performing color marking on a box body of a dialog box, or an entire area or a part of the area of the dialog box of the voice message. As shown in the following table, different color features represent different importance levels. In this way, it is convenient for a user of the first terminal to determine the importance of the voice message according to the color feature identifier of the voice message.

| Color | Importance |
| --- | --- |
| Red | Most important |
| Orange | Very important |
| yellow | Quite important |
| Blue | Relatively important |
| Green | Not important |

In some embodiments, the feature attribute identifier may be a geometric mark or a geometric figure having a color, for example, a dot, a pentagram, a red dot, or a yellow star, that is set near the dialog box of the voice message. For example, as shown in FIG. 3, a dot is set near a dialog box of a first voice message 31, and a pentagram is set near a dialog box of a second voice message 32. In this way, the importance of the voice messages is identified by using different geometric figures, so that the importance of the voice message can be quickly identified.

It should be noted that the first identification information may be only a text identifier, a picture identifier, or the like, or may be only a geometric mark or the like that can represent the importance, or may include both a text identifier, a picture identifier, and/or the like that can represent the content of the voice message and a geometric mark that can represent the importance. In some embodiments, the specific content of the first identification information may be set according to the actual need of a user, or may be preset by the manufacturer of the first terminal.

It should be noted that when the first identification information is text information, the text information may be text information input by the user, or may be text information that is obtained by the first terminal through parsing the first voice message.

In this embodiment, when the first voice message is displayed, the first identification information corresponding to the first voice message is displayed. Therefore, when a user of the first terminal wishes to search a voice message set corresponding to the first application for the first voice message, the first terminal can search for the first voice message by using the first identification information. In this way, the search time of searching for a particular voice message in an instant messaging application by a user is reduced, and hence the user experience is improved.

In this embodiment, the first terminal is a transmitting end, and the second terminal is a receiving end.

According to the message processing method consistent with embodiments of the present disclosure, a first terminal acquires, after running a first application to enter an information exchange mode, a first voice message input by a user; receives a first operation; extracts a first marking policy corresponding to the first voice message after detecting that the first voice message is successfully selected by using the first operation; and further selects, according to the first marking policy, first identification information corresponding to the first voice message, to display the first voice message carrying the first identification information. In this way, the displaying of the first voice message can be distinguished from that of other voice messages, to facilitate a user to search a voice message set of the first application for the first voice message. Therefore, compared with the existing methods of searching for a voice message, the message processing method consistent with the present disclosure can shorten the search time, thereby improving the user experience.

In some embodiments, after the first terminal marks the first voice message and displays the first voice message carrying the first identification information on the first terminal, to facilitate a receiving end, for example, a second terminal to, when receiving the first voice message, set identification information satisfying the need of the receiving end, the first identification information corresponding to the first voice message can also be sent to the second terminal, as described in more detail below.

In some embodiments, the first voice message is sent and the first identification information corresponding to the first voice message is sent, so that the second terminal adjusts a display manner of the first voice message according to the first identification information. That is, when sending the first voice message to the second terminal, the first terminal also sends the first identification information to the second terminal. In this way, the second terminal not only can receive the first voice message, but also can receive the first identification information used for performing marking processing on the first voice message by the first terminal. Further, after receiving the first identification information, the second terminal may directly perform marking processing on the first voice message according to the first identification information, so as to directly display the first voice message carrying the first identification information on the second terminal.

In some other embodiments, the second terminal adjusts the first identification information by using the first identification information as a reference, and re-identifies the first voice message according to the requirement of the second terminal, so as to display the first voice message carrying the adjusted identification information in the second terminal.

In some other embodiments, the second terminal directly blocks the first identification information, and maintains the display manner of the first voice message that is originally applied by the second terminal. For example, maintaining the display manner of the first voice message that is originally applied by the second terminal may refer to that when receiving the first identification information sent by the first terminal, the second terminal has already performed marking processing on the received first voice message according to the requirement of the second terminal, such as by using a second marking policy, and displays the first voice message carrying second identification information on the second terminal. In this case, the second terminal directly blocks the first identification information, and continues displaying the first voice message carrying the second identification information. As another example, maintaining the display manner of the first voice message that is originally applied by the second terminal may refer to that, when the second terminal receives the first identification information sent by the first terminal, although the second terminal has not performed marking processing on the first voice message, the second terminal does not accept the marking manner of the first terminal. In this case, the second terminal directly blocks the first identification information, and continues displaying the first voice message without identification information.

It should be noted herein that a sending time of the first voice message and a sending time of the first identification information can be different. For example, after acquiring the first voice message, the first terminal may directly send the first voice message. In this case, the first terminal has not performed marking processing on the first voice message, and the sending time of the first identification information is consequentially later than the sending time of the first voice message.

In some embodiments, the method consistent with the disclosure may further include generating a second voice message according to the first identification information and the first voice message, and sending the second voice message. That is, the first terminal directly generates the second voice message according to the first identification information and the first voice message, and directly sends the second voice message to the second terminal, so that after receiving the second voice message, the second terminal directly displays the second voice message. In some embodiments, the voice message sent by the first terminal can be a voice message carrying an identifier. In this case, after acquiring the first voice message, the first terminal does not directly send the first voice message, but determines, through a graphic user interface, whether the user wishes to perform marking processing on the first voice message. If the user instructs to perform the marking processing on the first voice message, the first terminal performs the marking processing on the first voice message to generate the second voice message and then sends the second voice message. Otherwise, the first terminal directly sends the first voice message without the identification information.

Figure 5:
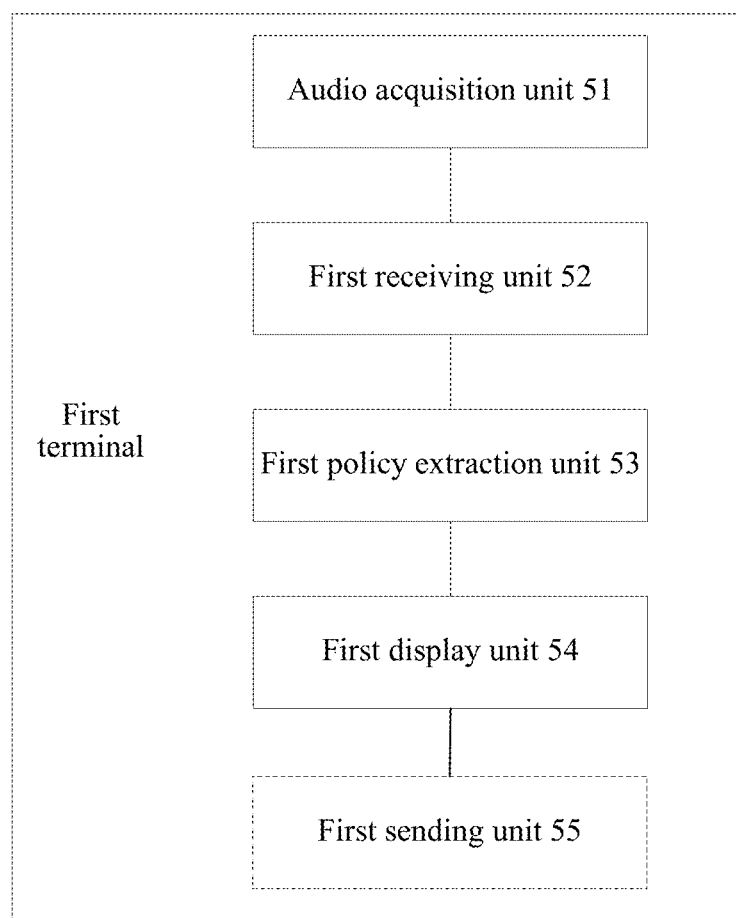
FIG. 5 is a schematic structural diagram of a terminal according to an embodiment of the present disclosure.

FIG. 5 is a schematic structural diagram of a terminal according to an embodiment of the present disclosure. The terminal described in this embodiment may be specifically a first terminal, that is, a transmitting end. As shown in FIG. 5, the terminal includes an audio acquisition unit 51, a first receiving unit 52, a first policy extraction unit 53, and a first display unit 54.

The audio acquisition unit 51 is configured to acquire, after the first terminal runs a first application to enter an information exchange mode, a first voice message input by a user.

The first receiving unit 52 is configured to receive a first operation. The first operation is used for selecting the first voice message.

The first policy extraction unit 53 is configured to extract a first marking policy corresponding to the first voice message after it is detected that the first voice message is successfully selected.

The first display unit 54 is configured to select, according to the first marking policy, first identification information corresponding to the first voice message, and display the first voice message carrying the first identification information.

In this embodiment, the first identification information is content information that is selected by the first terminal and that corresponds to the first voice message, and/or is level information of the first voice message that is selected by the first terminal. As such, by using the first identification information, displaying of the first voice message in the first terminal is different from that of other voice messages.

In some embodiments, the first display unit 54 is further configured to obtain, according to the first marking policy, the first identification information input by the user and corresponding to the first voice message, and display the first voice message carrying the first identification information. In some other embodiments, the first display unit 54 is further configured to select, according to the first marking policy, the first identification information corresponding to the first voice message from a correspondence between voice messages and identification information, and display the first voice message carrying the first identification information.

In some embodiments, as shown in FIG. 5, the terminal further includes a first sending unit 55 configured to send the first voice message. In some embodiments, the first sending unit 55 is further configured to send the first identification information corresponding to the first voice message, so that a second terminal adjusts the display manner of the first voice message according to the first identification information.

In some other embodiments, the first sending unit 55 is further configured to generate a second voice message according to the first identification information and the first voice message, and send the second voice message.

The audio acquisition unit 51, the first receiving unit 52, the first policy extraction unit 53, the first display unit 54, and the first sending unit 55 may all run in the first terminal, and may be implemented by a central processing unit (CPU), a micro processing unit (MPU), a digital signal processor (DSP), or a field programmable gate array (FPGA) that is located in the first terminal.

A person skilled in the art should understand that for the functions of the units of the first terminal consistent with embodiments of the present disclosure, reference can be made to the related description of the foregoing message processing methods applied to the first terminal. The units of the first terminal consistent with embodiments of the present disclosure may be implemented by an analog circuit implementing the functions consistent with embodiments of the present disclosure, or may be implemented by running software on an intelligent terminal to perform the functions consistent with embodiments of the present disclosure.

Figure 6:
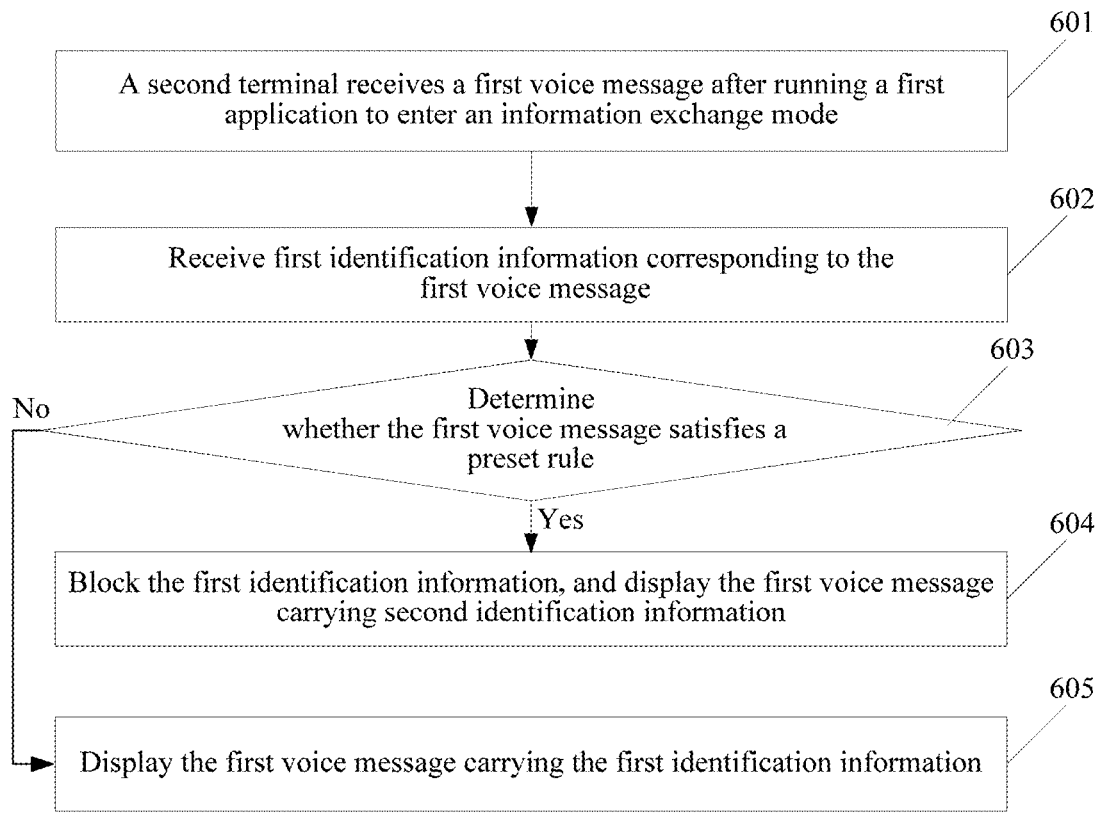
FIG. 6 is a schematic flowchart of a message processing method according to another embodiment of the present disclosure.

FIG. 6 is a schematic flowchart of a message processing method according to another embodiment of the present disclosure. The method is applied to a second terminal. As shown in FIG. 6, at 601, the second terminal receives a first voice message after running a first application to enter an information exchange mode.

In this embodiment, the first application may be an instant messaging application. In some embodiments, after entering the information exchange mode corresponding to the first application, the second terminal may directly receive a voice message sent by another terminal.

In some embodiments, after receiving the first voice message, the second terminal directly displays the first voice message.

At 602, first identification information corresponding to the first voice message is received.

In this embodiment, the second terminal not only can receive the first voice message, but also can receive the first identification information sent by a first terminal. The first identification information is information used for marking the first voice message by the first terminal according to a first marking policy. Further, after receiving the first identification information, the second terminal performs process 603, that is, determines whether the second terminal has performed marking processing on the first voice message.

A receiving time of the second identification information herein may be uncertain. Therefore, when receiving the first identification information, the second terminal may have or have not performed marking processing on the first voice message. Hence, if it needs to be determined how the second terminal should process the first identification information, it needs to be determined whether the marking processing has been performed on the first voice message, and the processing manner of the first identification information is further determined according to a determination result.

At 603, it is determined whether the first voice message satisfies a preset rule. The preset rule is used for representing that the first voice message is a voice message that is displayed on the second terminal and that carries second identification information. The second identification information is identification information that is selected according to a second marking policy and that corresponds to the first voice message. If the first voice message satisfies the preset rule, the second terminal performs the process at 604. Otherwise, the second terminal performs the process at 605.

In this embodiment, it is further determined, according to a determination result, whether to display the first voice message carrying the first identification information, as described in detail below.

At 604, the first identification information is blocked, and the first voice message carrying the second identification information is displayed.

At 605, the first voice message carrying the first identification information is displayed.

In this embodiment, when the first identification information is blocked, the second terminal performs marking processing on the first voice message by receiving a second operation for selecting the first voice message, extracting the second marking policy corresponding to the first voice message after detecting that the first voice message is successfully selected, selecting, according to the second marking policy, the second identification information corresponding to the first voice message, and displaying the first voice message carrying the second identification information.

In this way, after receiving the first voice message, the second terminal performs marking processing on the first voice message in the second terminal according to the second marking policy. The second marking policy is similar to the first marking policy described above. In some embodiments, the second marking policy may be a preset marking policy. Specifically, after receiving the first voice message, the second terminal extracts the second marking policy corresponding to the first voice message from a preset marking policy set, so that the second terminal can perform the marking processing on the first voice message according to the second marking policy.

In some other embodiments, the second marking policy is a marking policy that is temporarily generated by the second terminal according to the selected first voice message. Specifically, after detecting that the first voice message is successfully selected, the second terminal extracts a preset graphical interaction interface, and displays the preset graphical interaction interface in the second terminal, so that a user can input, in the second terminal by using the preset graphical interaction interface, the second identification information used for marking the first voice message. After the second identification information is input, the second terminal generates the second marking policy.

In this embodiment, the second identification information is content information that is selected by the second terminal and that corresponds to the first voice message, and/or is level information of the first voice message that is selected by the second terminal. As such, by using the second identification information, displaying of the first voice message in the second terminal is different from that of other voice messages. The second identification information may be a text identifier, a picture identifier, or the like that can be the content information corresponding to the first voice message. Using the text identifier as an example, as shown in FIG. 2, text identifying the content of a first voice message 21 may be added to the first voice message 21, to mark the first voice message. For example, the second terminal receives the first voice message 21 sent by a first terminal, and the general content of the first voice message 21 is an email address. In this case, a text identifier of "xx address" may be added to the first voice message 21 in the second terminal. A user of the second terminal can quickly recognize the content of the first voice message by using the text identifier. In addition, by using the text identifier, displaying of the first voice message is different from that of other voice messages.

As another example, the second identification information may be a feature attribute identifier that can represent the level information, for example, the importance, of the first voice message. Specifically, the feature attribute identifier may be a color feature identifier. That is, the color feature identifier that can represent the level information, for example, the importance, is used for performing color marking on a box body of a dialog box, or an entire area or a part of the area of the dialog box of the voice message. As shown in the following table, different color features represent different importance levels. In this way, it is convenient for a user of the second terminal to determine the importance of the voice message according to the color feature identifier of the voice message.

| Color | Importance |
|---|---|
| Red | Most important |
| Orange | Very important |
| yellow | Quite important |
| Blue | Relatively important |
| Green | Not important |

In some embodiments, the feature attribute identifier may be a geometric mark or a geometric figure having a color, for example, a dot, a pentagram, a red dot, or a yellow star, that is set near the dialog box of the voice message. For example, as shown in FIG. 3, a dot is set near a dialog box of a first voice message 31, and a pentagram is set near a dialog box of a second voice message 32. In this way, the importance of the voice messages is identified by using different geometric figures, so that the importance of the voice message can be quickly identified.

It should be noted that the second identification information may be only a text identifier, a picture identifier, or the like, or may be only a geometric mark or the like that can represent the importance, or may include both a text identifier, a picture identifier, and/or the like that can represent the content of the voice message and a geometric mark that can represent the importance. In some embodiments, the specific content of the second identification information may be set according to the actual need of a user, or may be preset by the manufacturer of the second terminal.

It should be noted that when the second identification information is text information, the text information may be text information input by the user, or may be text information that is obtained by the second terminal through parsing the first voice message.

Further, because the second marking policy may be a preset marking policy, or may be a marking policy that is temporarily generated according to second identification information input by the user, the second identification information may be preset identification information, or may be identification information input by the user, as described in more detail below.

When the second marking policy is the preset marking policy, a list that can represent a correspondence between voice messages and identification information is stored in a storage medium of the second terminal or is obtained from another data resource. Therefore, after obtaining the second marking policy, the second terminal can select the second identification information corresponding to the second marking policy from the correspondence list. In some embodiments, a correspondence list among a voice message, a marking policy, and identification information may be set as the preset correspondence list. In this way, the second terminal can perform marking processing on the voice message according to the preset correspondence list without the need for the user to input the identification information to mark the voice message.

When the second marking policy is the marking policy that is temporarily generated according to the second identification information input by the user, the second terminal can directly obtain, from the second marking policy, the second identification information that is input by the user and that corresponds to the first voice message, so as to facilitate obtaining the general content of the first voice message by using the second identification information.

Further, in the scenario that the first voice message satisfies the preset rule, the second terminal already displays the first voice message carrying the second identification information. In this case, determining, according to the determination result, whether to display the first voice message carrying the first identification information may include blocking the first identification information, and maintaining the display manner of the first voice message that is originally applied by the second terminal. That is, the second terminal directly blocks the first identification information, and maintains the display manner of the first voice message that is originally applied by the second terminal. In some embodiments, maintaining the display manner of the first voice message that is originally applied by the second terminal may refer to that when receiving the first identification information sent by the first terminal, the second terminal has already performed marking processing on the received first voice message according to the requirement of the second terminal, such as by using the second marking policy, and displays the first voice message carrying the second identification information on the second terminal. In this case, the second terminal directly blocks the first identification information, and continues displaying the first voice message carrying the second identification information. In some embodiments, a third possibility may exist. That is, when the second terminal receives the first identification information sent by the first terminal, although the second terminal has not performed marking processing on the first voice message, the second terminal does not accept the marking manner of the first terminal. In this case, the second terminal directly blocks the first identification information, and continues displaying the first voice message without identification information. Correspondingly, the preset rule is further used for characterizing that the voice message is a voice message sent by a terminal satisfying a user rule. That is, the second terminal may be set to not receive identification information sent by a specific terminal or by some specific terminals, i.e., identification information sent by the specific terminal(s) is directly blocked.

In the scenario that the first voice message does not satisfy the preset rule, determining, according to the determination result, whether to display the first voice message carrying the first identification information may include displaying the first voice message carrying the first identification information. That is, after receiving the first identification information, the second terminal may directly perform marking processing on the first voice message according to the first identification information, so as to directly display the first voice message carrying the first identification information on the second terminal.

In some embodiments, after receiving the first identification information, the second terminal may use the first identification information as a reference, adjust the first identification information according to the second marking policy, and further re-identify the first voice message according to the requirement of the second terminal, to form the second identification information, so as to display the first voice message carrying the second identification information on the second terminal.

In this embodiment, the first terminal may further directly generate a second voice message according to the first identification information and the first voice message, and directly send the second voice message to the second terminal, so that after receiving the second voice message, the second terminal directly displays the second voice message.

Further, the second terminal receives and displays the second voice message generated by the first terminal according to the first identification information and the first voice message. In some embodiments, the voice message sent by the first terminal is a voice message carrying an identifier. In this case, after acquiring the first voice message, the first terminal does not directly send the first voice message, but determines, through a graphic user interface, whether the user wishes to perform marking processing on the first voice message. If the user instructs to perform the marking processing on the first voice message, the first terminal performs the marking processing on the first voice message to generate the second voice message and then sends the second voice message. Otherwise, the first terminal directly sends the first voice message without the identification information.

In this embodiment, when the first voice message is displayed, the first identification information or the second identification information that corresponds to the first voice message is displayed. Therefore, when a user of the second terminal wishes to search a voice message set corresponding to the first application for the first voice message, the second terminal can search for the first voice message by using the first identification information or the second identification information. In this way, the search time of searching for a particular voice message in an instant messaging application by a user is reduced, and hence the user experience is improved.

In this embodiment, the first terminal is a transmitting end, and the second terminal is a receiving end.

According to the message processing method consistent with embodiments of the present disclosure, after running a first application to enter an information exchange mode, a second terminal receives a first voice message, receives first identification information corresponding to the first voice message, determines whether the first voice message satisfies a preset rule, and further determines, according to a determination result, whether to display the first voice message carrying the first identification information. In this way, the second terminal can individually select the manner of marking the first voice message by the second terminal. In addition, after the second terminal displays the first voice message carrying the identification information, the displaying of the identified first voice message can be distinguished from that of other voice messages, to facilitate a user to search a voice message set of the first application for the first voice message. Therefore, compared with the existing method of searching for a voice message, the message processing method consistent with the present disclosure can shorten the search time, thereby improving the user experience.

Figure 7:
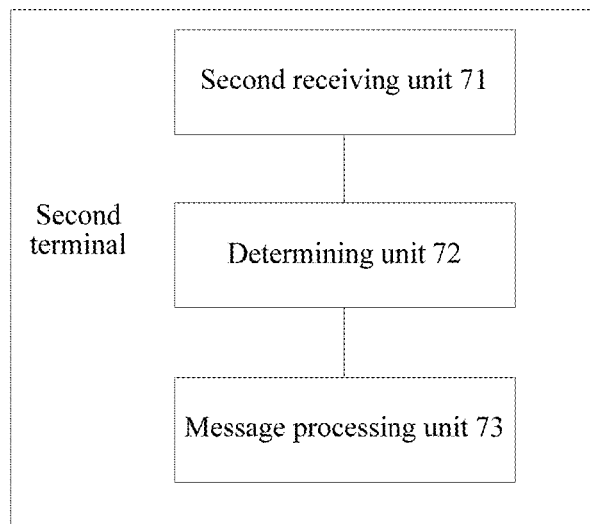
FIG. 7 is a schematic structural diagram of a terminal according to another embodiment of the present disclosure.

FIG. 7 is a schematic structural diagram of a terminal according to an embodiment of the present disclosure. The terminal described in this embodiment may be a second terminal, that is, a receiving end. As shown in FIG. 7, the terminal includes a second receiving unit 71, a determining unit 72, and a message processing unit 73.

The second receiving unit 71 is configured to receive a first voice message after the second terminal runs a first application to enter an information exchange mode, and to receive first identification information corresponding to the first voice message.

The determining unit 72 is configured to determine whether the first voice message satisfies a preset rule. The preset rule is used for representing that the first voice message is a voice message that is displayed on the second terminal and that carries second identification information. The second identification information is identification information that is selected according to a second marking policy and that corresponds to the first voice message.

The message processing unit 73 is configured to determine, according to a determination result, whether to display the first voice message carrying the first identification information.

In this embodiment, the second identification information is content information that is selected by the second terminal and that corresponds to the first voice message, and/or represents level information of the first voice message that is selected by the second terminal. As such, by using the second identification information, the displaying of the first voice message in the second terminal is different from that of other voice messages.

In some embodiments, the terminal further includes a second policy extraction unit and a second display unit. In these embodiments, the second receiving unit is further configured to receive a second operation for selecting the first voice message. The second policy extraction unit is configured to extract the second marking policy corresponding to the first voice message after it is detected that the first voice message is successfully selected. The second display unit is configured to select, according to the second marking policy, the second identification information corresponding to the first voice message, and display the first voice message carrying the second identification information.

In some other embodiments, the message processing unit 73 is further configured to block the first identification information when the first voice message satisfies the preset rule, and display the first voice message carrying the second identification information; and display the first voice message carrying the first identification information when the first voice message does not satisfy the preset rule.

In some other embodiments, the second receiving unit 71 is further configured to receive and display a second voice message generated by the first terminal according to the first identification information and the first voice message.

The second receiving unit 71, the determining unit 72, the message processing unit 73, the second policy unit, and the second display unit may all run in the second terminal, and may be implemented by a central processing unit (CPU), a micro processing unit (MPU), a digital signal processor (DSP), or a field programmable gate array (FPGA) that is located in the second terminal.

A person skilled in the art should understand that for the functions of the units of the first terminal consistent with embodiments of the present disclosure, reference can be made to the related description of the foregoing message processing methods applied to the second terminal. The units of the second terminal consistent with embodiments of the present disclosure may be implemented by an analog circuit implementing the functions consistent with embodiments of the present disclosure, or may be implemented by running software on an intelligent terminal to perform the functions consistent with embodiments of the present disclosure.

It should be noted that the functions of the first terminal and the second terminal may be in a terminal having both a sending function and a receiving function, or may be in different terminals, that is, may be respectively implemented by using a terminal having a sending function and a terminal having a receiving function.

Figure 11:
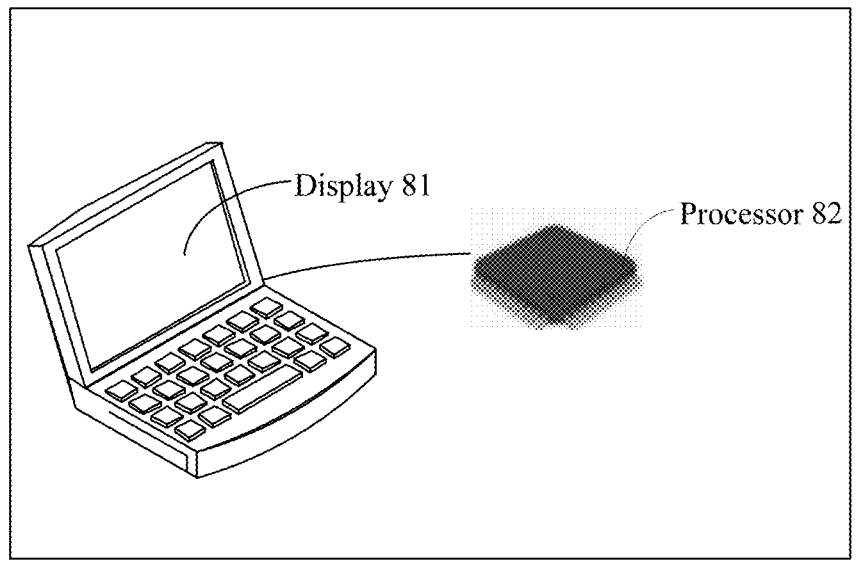
FIG. 11 is a schematic structural diagram of a terminal according to an embodiment of the present disclosure.

FIG. 11 shows a structural diagram of a terminal according to an embodiment of the present disclosure. As shown in FIG. 11, the terminal includes a display 81 and a processor 82. The display 81 is configured to display information on a user interface. The processor 82 is configured to perform a message processing method consistent with the disclosure, such as one of the examples of method described above. In some embodiments, the processor 82 is configured to execute executable instructions to acquire a first voice message input by a user after the terminal runs a first application to enter an information exchange mode, receive a first operation for selecting the first voice message, extract a first marking policy corresponding to the first voice message after detecting that the first voice message is successfully selected, select, according to the first marking policy, first identification information corresponding to the first voice message, and display, by using the display 81, the first voice message carrying the first identification information.

Figure 12:
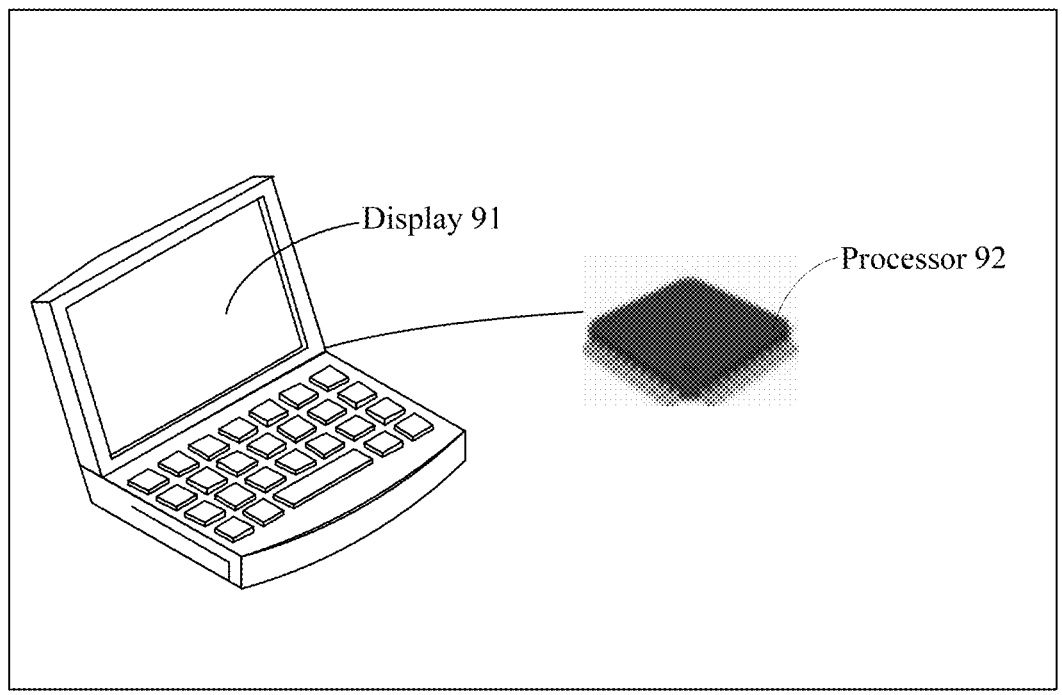
FIG. 12 is a schematic structural diagram of a terminal according to another embodiment of the present disclosure.

FIG. 12 shows a structural diagram of a terminal according to another embodiment of the disclosure. As shown in FIG. 12, the terminal includes a display 91 and a processor 92. The display 91 is configured to display information on a user interface. The processor 92 is configured to perform a message processing method consistent with the disclosure, such as one of the examples of method described above. In some embodiments, the processor 92 is configured to execute executable instructions to receive a first voice message after the terminal runs a first application to enter an information exchange mode, receive first identification information corresponding to the first voice message, determine whether the first voice message satisfies a preset rule, and determine, according to a determination result, whether to display the first voice message carrying the first identification information. The preset rule is used for representing that the first voice message is a voice message that is displayed on the terminal and that carries second identification information. The second identification information is identification information that is selected according to a second marking policy and that corresponds to the first voice message.

The terminal shown as a notebook in FIG. 11 or FIG. 12 is merely an example. In some embodiments, the terminal may be a mobile phone, a tablet computer, a desktop computer, an all-in-one machine, or the like.

Correspondingly, the present disclosure further provides a non-transitory computer-readable storage medium storing computer executable instructions. The computer executable instructions are configured to instruct a processor, such as the processor 82 shown in FIG. 11 or the processor 92 shown in FIG. 12 to perform a message processing method consistent with the disclosure, such as one of the above-described message processing methods. The storage medium can be implemented as a part of the terminal shown in FIG. 11 or a part of the terminal shown in FIG. 12.

Some implementation processes consistent with embodiments of the present disclosure are described below in detail with reference to FIGS. 8-10.

Figure 8:
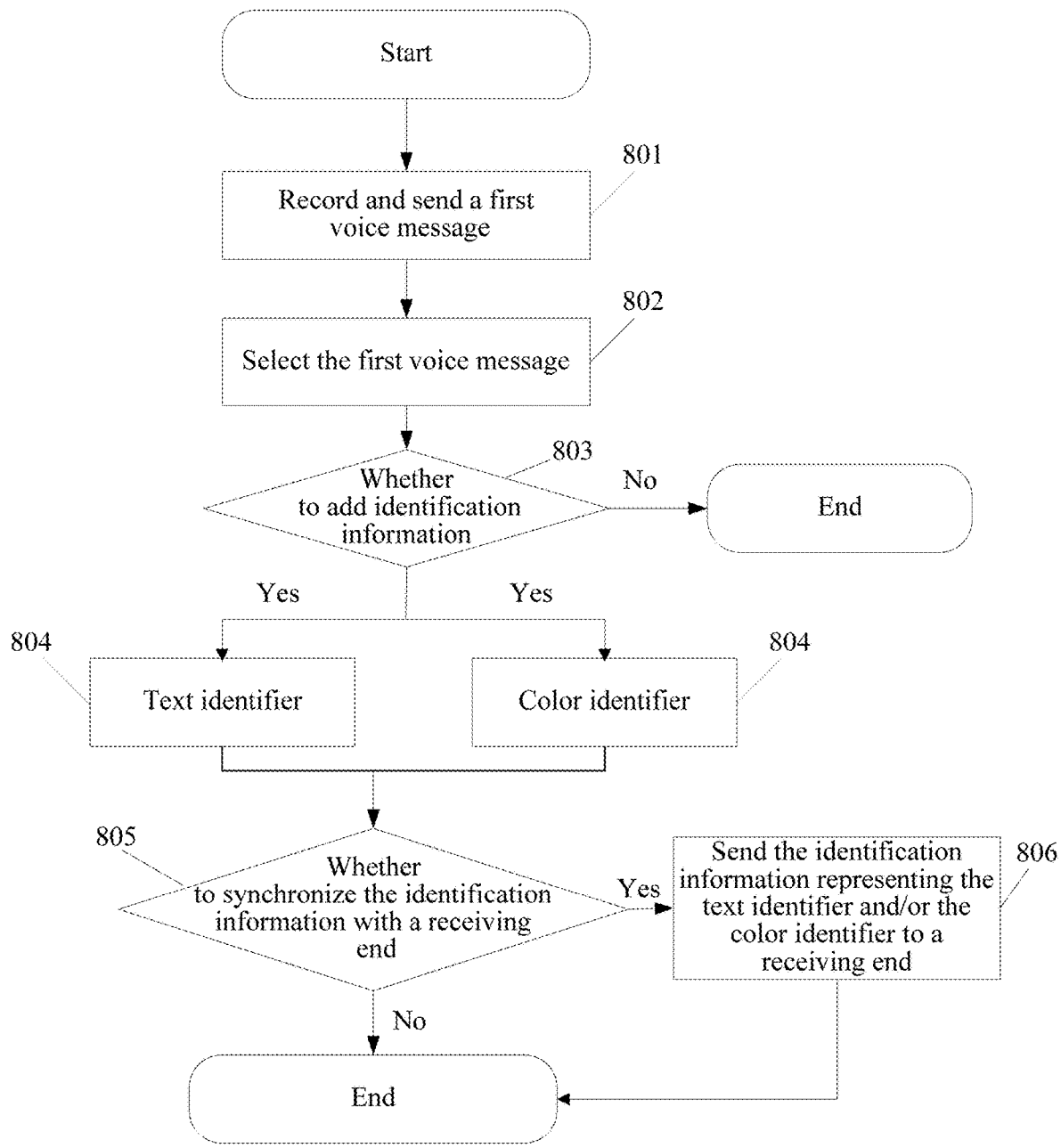
FIG. 8 is a schematic flowchart of a message processing method according to another embodiment of the present disclosure.

FIG. 8 is a schematic flowchart of a message processing method according to another embodiment of the present disclosure. The method is applied to a first terminal, and the first terminal is a transmitting end. As shown in FIG. 8, at 801, the first terminal records and sends a first voice message.

At 802, the first terminal selects the first voice message.

At 803, the first terminal generates first prompt information, to prompt whether to add identification information. If yes, the first terminal performs the process at 804. Otherwise, the procedure ends.

At 804, the first terminal generates second prompt information, to prompt that the identification information is a text identifier, a color identifier, or a text identifier and a color identifier. After the text identifier and/or the color identifier is selected and added, the first terminal performs the process at 805.

At 805, the first terminal generate third prompt information, to prompt whether to synchronize the identification information with a receiving end. If yes, the first terminal performs the process at 806. Otherwise, the first terminal directly displays the first voice message carrying the text identifier and the color identifier, and the procedure ends.

At 806, the first terminal displays the first voice message carrying the text identifier and the color identifier, and sends the identification information representing the text identifier and the color identifier to the receiving end.

Figure 9:
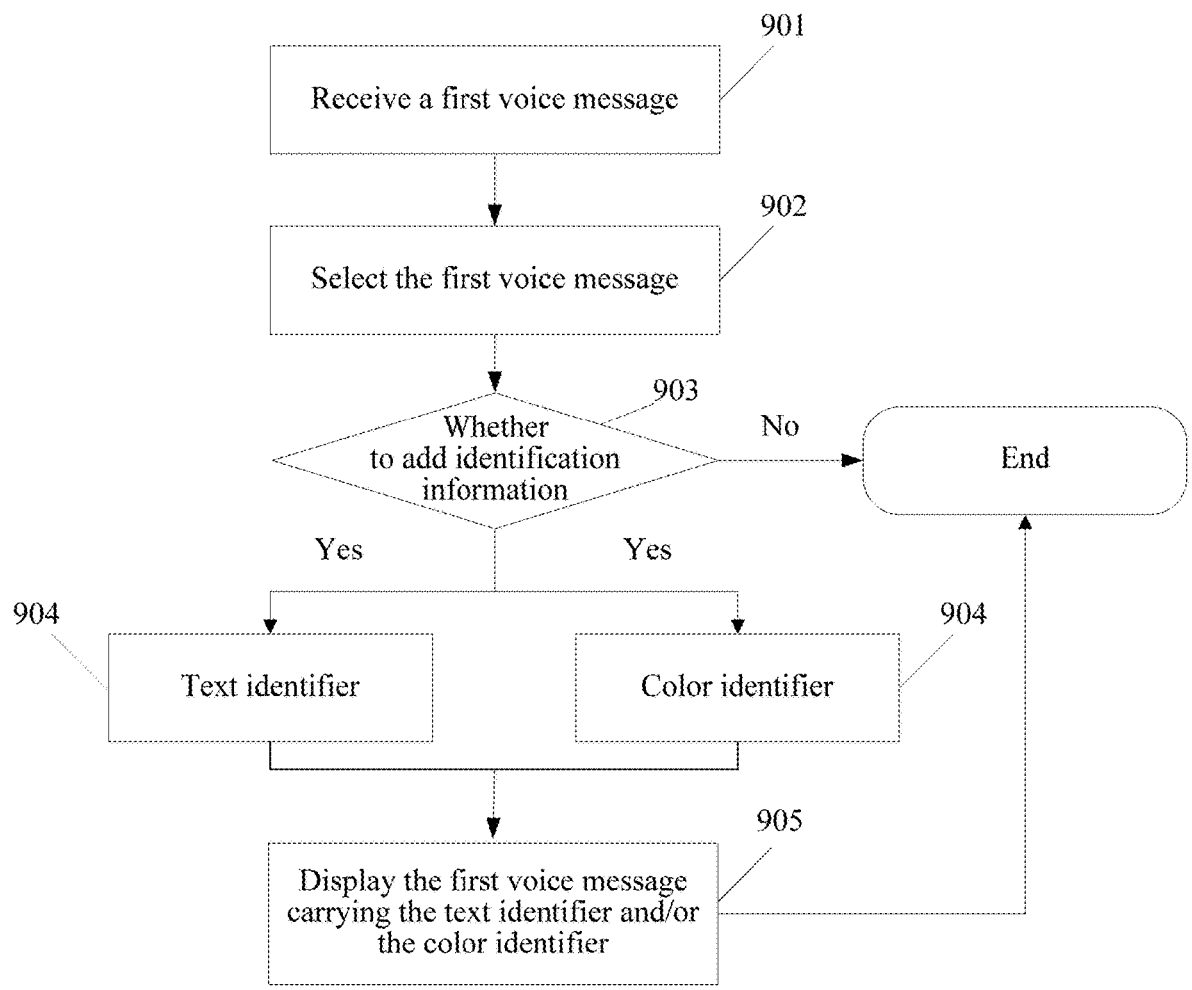
FIG. 9 is a schematic flowchart of a message processing method according to another embodiment of the present disclosure.

FIG. 9 is a schematic flowchart of a message processing method according to another embodiment of the present disclosure. The method is applied to a second terminal, and the first terminal is a receiving end. As shown in FIG. 9, at 901, the second terminal receives a first voice message.

At 902, the second terminal selects the first voice message.

At 903, the second terminal generates first prompt information, to prompt whether to add identification information. If yes, the second terminal performs the process at 904. Otherwise, the procedure ends.

At 904, the second terminal generates second prompt information, to prompt that the identification information is a text identifier, a color identifier, or a text identifier and a color identifier. Then, the second terminal performs the process at 905.

At 905, the second terminal selects to add the text identifier and/or the color identifier and, after the addition is completed, displays the first voice message carrying the text identifier and the color identifier, and the procedure ends.

Figure 10:
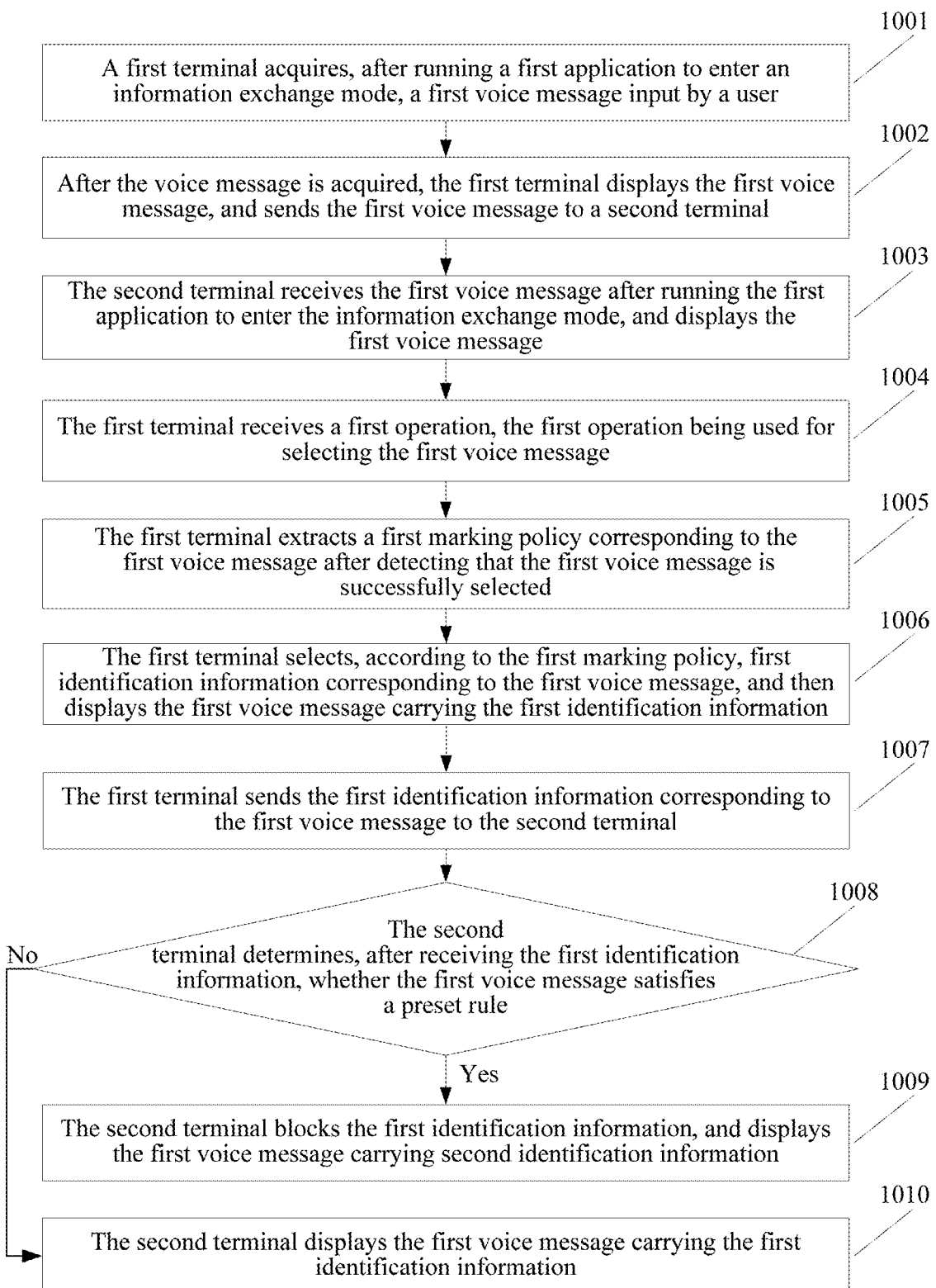
FIG. 10 is a schematic flowchart of a message processing method according to another embodiment of the present disclosure.

FIG. 10 is a schematic flowchart of a message processing method according to another embodiment of the present disclosure. As shown in FIG. 10, at 1001, a first terminal acquires, after running a first application to enter an information exchange mode, a first voice message input by a user.

At 1002, after the voice message is acquired, the first terminal displays the first voice message, and sends the first voice message to a second terminal.

At 1003, the second terminal receives the first voice message after running the first application to enter the information exchange mode, and displays the first voice message.

At 1004, the first terminal receives a first operation, the first operation being used for selecting the first voice message.

At 1005, the first terminal extracts a first marking policy corresponding to the first voice message after detecting that the first voice message is successfully selected.

At 1006, the first terminal selects, according to the first marking policy, first identification information corresponding to the first voice message, and then displays the first voice message carrying the first identification information.

At 1007, the first terminal sends the first identification information corresponding to the first voice message to the second terminal.

At 1008, the second terminal determines, after receiving the first identification information, whether the first voice message satisfies a preset rule. If yes, the second terminal performs the process at 1009. Otherwise, the second terminal performs the process at 1010.

At 1009, the second terminal blocks the first identification information, and displays the first voice message carrying second identification information.

At 1010, the second terminal displays the first voice message carrying the first identification information.

In the embodiments of the present disclosure, when the integrated module is implemented in the form of a software functional module and sold or used as an independent product, the integrated module may be stored in a computer-readable storage medium. Based on such an understanding, a person skilled in the art should understand that the embodiments of this application may be provided as a method, a system, or a computer program product. Therefore, this application includes the form of hardware only embodiments, software only embodiments, or embodiments with a combination of software and hardware. Moreover, this application includes the form of a computer program product that is implemented on one or more computer-usable storage media including computer-usable program code. The storage medium includes, but is not limited to, a USB flash drive, removable hard disk, a read-only memory (ROM), a magnetic disk storage, a CD-ROM, an optical memory, or the like.

This application is described according to the flowcharts and/or block diagrams of the method, the device (system), and the computer program product in the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and processes are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, a person skilled in the art can additionally change and modify these embodiments once understanding the basic concept of the present disclosure. Therefore, the following claims are intended to be construed as to cover described embodiments and all changes and modifications falling within the scope of this application.

INDUSTRIAL APPLICABILITY

According to the message processing method consistent with embodiments of the present disclosure, a first terminal acquires, after running a first application to enter an information exchange mode, a first voice message input by a user; receives a first operation; extracts a first marking policy corresponding to the first voice message after detecting that the first voice message is successfully selected by using the first operation; and further selects, according to the first marking policy, first identification information corresponding to the first voice message, to display the first voice message carrying the first identification information. In this way, the displaying of the first voice message can be distinguished from that of other voice messages, to facilitate a user to search a voice message set of the first application for the first voice message. Therefore, compared with the existing methods of searching for a voice message, the message processing method consistent with the present disclosure can shorten the search time, thereby improving the user experience.

What is claimed is:

1. A message processing method to be executed on a terminal, the method comprising:
  acquiring a voice message;
  after acquiring the voice message, extracting a marking policy, the marking policy including at least one of a preset marking policy and a temporary marking policy, wherein the preset marking policy is pre-stored in the terminal and the temporary marking policy is entered by a user via a graphical interaction interface of the terminal;

generating, according to the marking policy identification information indicating at least one of content information and level information of the voice message, the identification information being a marker including at least one of a geometric figure, a color, and an email address; and displaying, on a screen of the terminal, the voice message and the identification information, the identification information being displayed separately from but near where the voice message is displayed.

2. The method according to claim 1, further comprising:
sending the voice message at a first time point; and
sending the identification information at a second time point later than the first time point, to allow time for generating the identification information.

3. The method according to claim 1, wherein the voice message is a first voice message, the method further comprising:
generating a second voice message by connecting the identification information to the first voice message; and
sending the second voice message, wherein both the first voice message and the identification information are sent together in the form of the second voice message.

4. A terminal comprising: a processor; and a storage medium storing instructions that, when executed by the processor, cause the processor to:
acquire a voice message;
after acquiring the voice message, extract a marking policy, the marking policy including at least one of a preset marking policy and a temporary marking policy, wherein the preset marking policy is pre-stored in the terminal and the temporary marking policy is entered by a user via a graphical interaction interface of the terminal;
generate, according to the marking policy, identification information indicating at least one of content information and level information of the voice message, the identification information being a marker including at least one of a geometric figure, a color, and an email address; and
display, on a screen of the terminal, the voice message and the identification information, the identification information being displayed separately from but near where the voice message is displayed.

5. The terminal according to claim 4, wherein the instructions further cause the processor to:
send the voice message at a first time point; and
send the identification information at a second time point later than the first time point, to allow time for generating the identification information.

6. The terminal according to claim 4, wherein: the voice message is a first voice message, and the instructions further cause the processor to:
generate a second voice message by connecting the identification information to the first voice message; and
send the second voice message, wherein both the first voice message and the identification information are sent together in the form of the second voice message.

7. A message processing method comprising:
receiving, by a receiving terminal, a voice message sent from a sending terminal;
receiving, by the receiving terminal, first identification information sent from the sending terminal and indicating at least one of content information and level information of the voice message, the first identification information being generated according to a first marking policy, the first marking policy including at least one of a first preset marking policy and a first temporary marking policy, wherein the first preset marking policy is pre-stored in the sending terminal and the first temporary marking policy is entered by a sending user via a graphical interaction interface at the sending terminal;
generating, by the receiving terminal, second identification information corresponding to the first identification information according to a second marking policy, the second marking policy including at least one of a second preset marking policy and a second temporary marking policy, wherein the second preset marking policy is pre-stored in the receiving terminal and the second temporary marking policy is entered by a receiving user via a graphical interaction interface at the receiving terminal; and
if the voice message satisfies a preset rule, displaying, on a screen of the receiving terminal, the voice message and the second identification information, the second identification information being displayed separately from but near where the voice message is displayed.

8. The method according to claim 7, wherein displaying the voice message comprises displaying the voice message and the second identification information while blocking the first identification information from being displayed on the screen of the receiving terminal.

9. The method according to claim 7, further comprising, if the voice message does not satisfy the preset rule:
displaying, on the screen of the receiving terminal, the voice message and the first identification information, while blocking the second identification information from being displayed, wherein the voice message is displayed separately from but near where the first identification information is displayed.

10. A terminal comprising: a processor; and a storage medium storing instructions that, when executed by the processor, cause the processor to:
receive, by a receiving terminal, a voice message sent from a sending terminal;
receive, by the receiving terminal, first identification information sent from the sending terminal and indicating at least one of content information and level information of the voice message, the first identification information being generated according to a first marking policy, the first marking policy including at least one of a first preset marking policy and a first temporary marking policy, wherein the first preset marking policy is pre-stored in the sending terminal and the first temporary marking policy is entered by a sending user via a graphical interaction interface at the sending terminal;
generate, by the receiving terminal, second identification information corresponding to the first identification information according to a second marking policy, the second marking policy including at least one of a second preset marking policy and a second temporary marking policy, wherein the second preset marking policy is pre-stored in the receiving terminal and the second temporary marking policy is entered by a receiving user via a graphical interaction interface at the receiving terminal; and
if the voice message satisfies a preset rule, display, on a screen of the receiving terminal, the voice message and the second identification information, the second identification information being displayed separately from but near where the voice message is displayed.

11. The terminal according to claim 10, wherein the instructions further cause the processor to display the voice message and the second identification information while blocking the first identification information from being displayed on the screen of the receiving terminal.

12. The terminal according to claim 10, further comprising, if the voice message does not satisfy the preset rule:
- display, on the screen of the receiving terminal, the voice message and the first identification information, while blocking the second identification information from being displayed, wherein the voice message is displayed separately from but near where the first identification information is displayed.

\* \* \* \* \*